United States Patent [19]
Thompson et al.

[11] Patent Number: 5,503,367
[45] Date of Patent: Apr. 2, 1996

[54] BUTTERFLY VALVE SEAL

[75] Inventors: Derek Thompson, North Hykham; Magnus E. Flett, Earlsheaton, both of England

[73] Assignee: WABCO Automotive U.K. Limited, Rugby, United Kingdom

[21] Appl. No.: 199,131

[22] PCT Filed: Sep. 10, 1992

[86] PCT No.: PCT/GB92/01654

§ 371 Date: Apr. 25, 1994

§ 102(e) Date: Apr. 25, 1994

[87] PCT Pub. No.: WO93/06396

PCT Pub. Date: Apr. 1, 1993

[30] Foreign Application Priority Data

Sep. 13, 1991 [GB] United Kingdom ............... 9119644

[51] Int. Cl.$^6$ .............................. F16K 41/00; F16J 15/30
[52] U.S. Cl. .............................. 251/214; 251/305; 277/3; 277/29; 277/71; 277/173
[58] Field of Search .................... 251/214, 305, 251/308; 277/3, 29, 70, 71, 173, 174, 177

[56] References Cited

U.S. PATENT DOCUMENTS

| | | | |
|---|---|---|---|
| 3,179,422 | 4/1965 | Phillips | 277/3 |
| 3,746,301 | 7/1973 | Budzich et al. | 251/214 |
| 3,988,000 | 10/1976 | Reese | 251/214 |
| 4,022,424 | 5/1977 | Davis et al. | 251/214 |
| 4,291,863 | 9/1981 | Gachot | 251/214 |
| 4,328,974 | 5/1982 | White et al. | 251/214 |
| 4,353,388 | 10/1982 | Isoyama et al. | 251/214 |
| 4,398,727 | 8/1983 | Rylander | 277/3 |
| 4,447,062 | 5/1984 | Leicht | 277/3 |
| 4,541,612 | 9/1985 | Yohner | 251/214 |
| 4,640,305 | 2/1987 | Johnson | 251/214 |
| 4,721,313 | 1/1988 | Pennick | 277/3 |
| 4,773,440 | 9/1988 | Yanagawa et al. | 251/214 |
| 5,037,065 | 8/1991 | Hirz et al. | 251/214 |
| 5,078,175 | 1/1992 | Martin et al. | 251/214 |
| 5,251,874 | 10/1993 | Coleman et al. | 251/214 |

FOREIGN PATENT DOCUMENTS

| | | |
|---|---|---|
| 922800 | 1/1955 | Germany. |
| 2038225 | 3/1972 | Germany. |
| 2840549 | 9/1981 | Germany. |
| 3620890 | 12/1987 | Germany. |
| 2076907 | 12/1981 | United Kingdom. |

*Primary Examiner*—George L. Walton
*Attorney, Agent, or Firm*—Meltzer, Lippe, Goldstein, et al.

[57] ABSTRACT

An exhaust gas obturator comprises a tubular housing (11a) having a butterfly valve (14a,15) journalled in the wall thereof. The butterfly valve spindle (14a) passes through a chamber (24,25) on one side of the housing and carries a sealing ring (26) thereon and located in the chamber (24,25). The sealing ring (26) is a close sliding fit on the butterfly valve spindle (14a) when the obturator is closed, exhaust gas pressure on the upstream side enters the chamber (24,25) and urges the seal (26) against a cover plate (23a) thereby to prevent the escape of exhaust gas to atmosphere. The chamber (24,25) is preferably vented to the downstream side. The seal may alternatively be biased by resilient means (not shown).

13 Claims, 2 Drawing Sheets

BUTTERFLY VALVE SEAL

This invention relates to an improved seal for the spindle of a butterfly valve, particularly a butterfly valve used as an obturator in the exhaust of an internal combustion engine.

Exhaust obturators, for I.C. engines, have been known for many years and often comprise a butterfly valve located close to the engine and operable to close the exhaust duct. With the butterfly valve in the open condition, pressure in the exhaust system is normal, but when the valve is closed, pressure upstream of the valve rises very quickly, and the resultant back pressure on the engine acts as a brake.

The maximum pressure upstream of the valve when the butterfly is closed is directly related to the retarding effect of the engine, but is however limited by the condition of the engine and the maximum back pressure that the engine valves and gaskets are designed to withstand. Design back pressures up to 5 bar (75 p.s.i.) are typical.

Exhaust obturators have uses other than as an exhaust brake. An obturator may be designed to divert flow from one exhaust stack to another, thereby permitting incineration of unburnt hydrocarbons in a non-working stack. Alternatively, or in addition, an obturator may be used to impose a low back pressure on an engine, thereby to make the engine work harder and reduce warm-up time from cold start; such an arrangement has the particular advantage of reducing cab warm-up time in cold weather.

The fit of the butterfly valve in the exhaust duct is not critical (unless used as a diverter valve) and a small leakage can be tolerated. Sealing of the butterfly spindle where it passes through the wall of the exhaust duct to an operating lever is, however, more important, because when the butterfly is closed, the high upstream pressure may cause a jet of very hot raw exhaust gas to issue, often at pedestrian level. This problem is compounded by the need for reasonable large spindle/bearing clearance to cater for heat expansion, and exacerbated by the fact that, when the butterfly is closed, the spindle is pushed in the low pressure direction, thus maximising the spindle clearance on the high pressure side.

Hitherto, the problem of spindle sealing has usually been solved by the use of a strong spring to bias an annular face of the spindle against an annular face of the butterfly valve body. The metal/metal seal is not very satisfactory and results in a high operating load, high drag forces and very high hysteresis. The arrangement is nevertheless acceptable for directly operated single function obturators.

In recent times it has been proposed to provide reactive butterfly obturators, in which the butterfly itself reacts to changes in back pressure. Such a reactive butterfly valve is described in WO-A-9208887. In this arrangement axial loading of the spindle to form a gas seal is unacceptable because the high hysteresis and drag would prevent reaction of the butterfly to small changes in back pressure; reaction would also be inconsistent.

It is essential to provide a spindle seal which ensures that raw exhaust gases do not leak to the exterior of the obturator; small leakage past the butterfly to the low pressure side can be tolerated without detriment to operation of an exhaust brake or cab heater.

The present invention provides a spindle seal which is more effective than in prior art arrangements, and which exerts no axial load on the butterfly spindle.

According to the invention there is provided an exhaust obturator comprising a tubular housing, a spindle crossing said housing and journalled in the wall thereof, and a butterfly attached to said spindle and arcuately movable with the spindle to open and close the obturator, the wall of the housing defining a chamber through which said spindle passes, the chamber defining an annular space around said spindle and having a sealing face substantially perpendicular to the axis of said spindle, and said spindle having an annular sealing ring slidable thereon and movable into sealing engagement with said sealing face under the action of a biasing force.

Preferably said seal is of graphite and has opposed radially extending faces normal to the axis of said spindle, one face being for sealing contact with an end wall of the chamber normal to the axis of said spindle.

In one embodiment the sealing ring is resiliently biased against the sealing face of said chamber.

In a preferred embodiment the sealing ring is urged by exhaust gas pressure against the sealing face, the sealing ring acting in the manner of a piston in said chamber and sliding along said spindle to form a substantially gas tight seal for said chamber.

In the preferred embodiment said housing comprises a tubular body and a cover plate, said chamber comprising a double diameter bore of said body and said end wall comprising a cover plate secured to said body and closing said chamber.

Alternatively the body may be closed by a press-in plug or any other suitable means.

Preferably the first and second diameter portions are co-axial about said spindle axis.

In a preferred embodiment said second diameter portion is connected through a vent to the downstream of said butterfly. Said vent may comprise a flat or groove in the exterior of said spindle, or a passageway in said housing. Preferably said vent is not on a thrust face of said spindle.

Other aspects of the invention will be apparent from the following description of a preferred embodiment described by way of example only with reference to the accompanying drawings in which.

Figure 4:
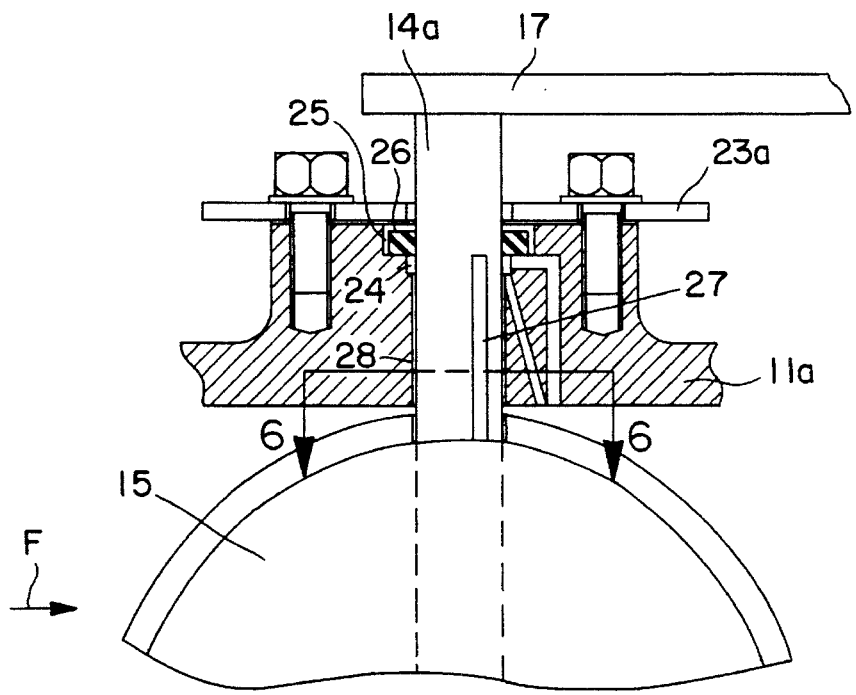
FIG. 4 is a schematic partial transverse section through a butterfly obturator according to the invention and in the open condition.
Figure 6:
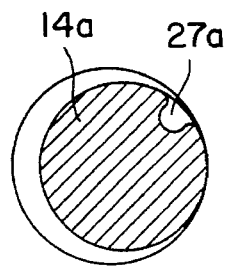
Figure 5:
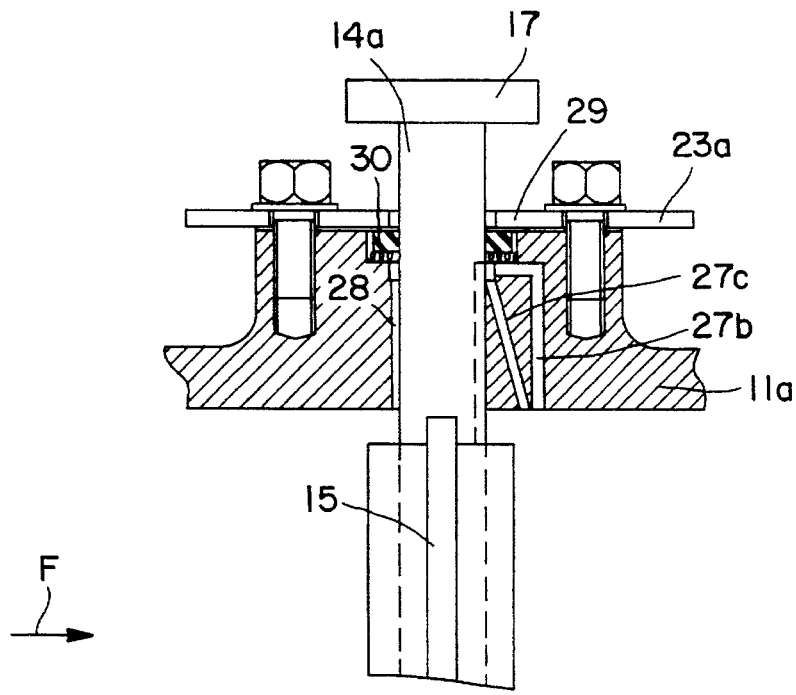

FIG. 5 corresponds to FIG. 4 but illustrates the butterfly in the closed condition; and FIG. 6 is an exaggerated illustration of the spindle clearance of the butterfly illustrated in FIG. 5 and on line X—X.

Figure 1:
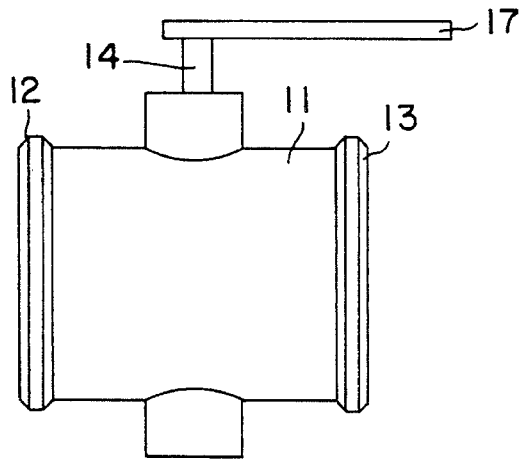
FIG. 1 is a side elevation of a conventional butterfly exhaust obturator.
Figure 2:
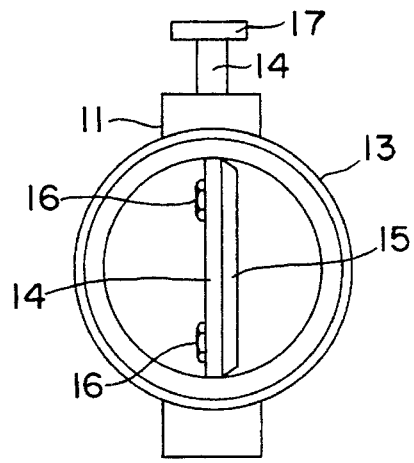
FIG. 2 is an end elevation of the obturator of FIG. 1.

With reference to FIGS. 1 and 2 there is illustrated a conventional exhaust obturator of the kind typically installed in the exhaust system of a heavy truck. The obturator comprises a generally cylindrical body 11 having flanges 12,13 to accept the flared ends of upstream and downstream exhaust pipes; these pipes are secured by circular clips (not shown) or by any other suitable means.

The housing contains a transverse spindle 14 to which is attached a conventional butterfly 15 by, for example, set screws 16 or rivets. The spindle 14 is journalled in the housing and protrudes through the housing at one end for attachment to an actuating lever 17. The other end of the spindle 14 is located in a blind bore.

Arcuate movement of the lever 17, by for example a pneumatic cylinder, causes the butterfly 15 to open and shut in accordance with operation of a drivers control lever or footbrake.

Figure 3:
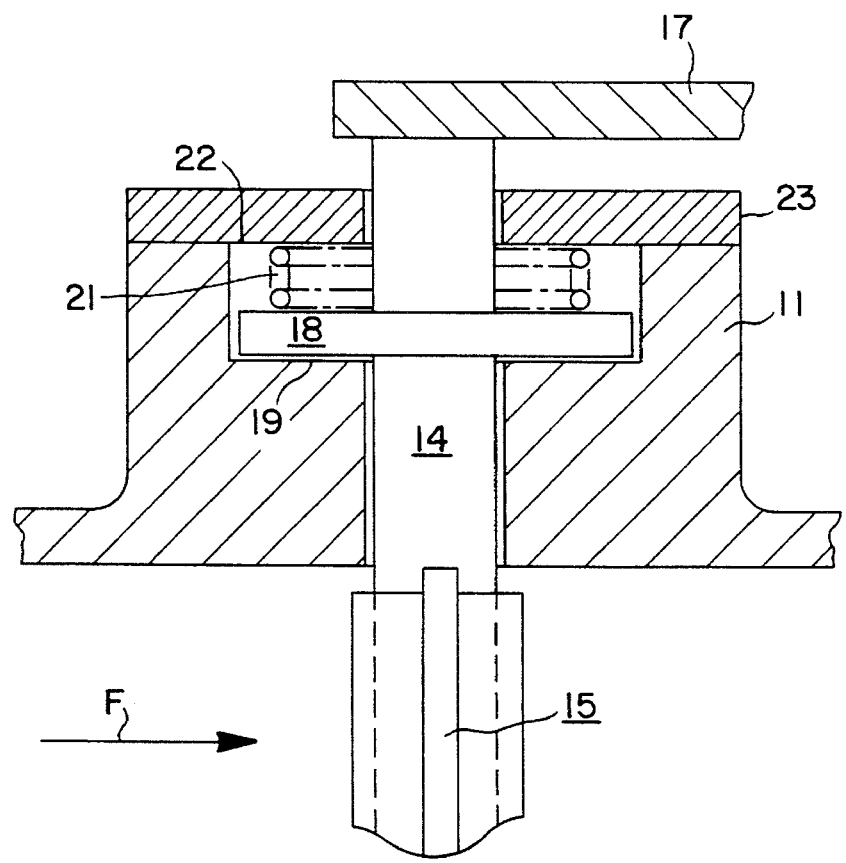
FIG. 3 is a schematic partial transverse section through a prior art obturator.

FIG. 3 illustrates a conventional gas seal for the spindle 14, the direction of gas flow being signified by arrow F. The spindle 14 has a circular flange 18 which is urged against a corresponding thrust face 19 of the body 11 by a spring 21; the spring reacts against a support surface 22 of a cover plate 12, secured to the body 11 by any suitable means.

In use, the spring ensures a face seal between the flange 18 and thrust face 19, the butterfly clearance being designed such that the distal side of the butterfly does not rub against the body 11. In practice this results in a less than perfect butterfly seal, and frequently the remote side of the butterfly does, in fact, rub on the housing, causing wear, additional operating loads and poor sealing between the flange 18 and thrust face 19.

The metal/metal seal provided by the flange 18 and thrust face 19 does not give a particularly good gas seal but has hitherto been considered adequate. The arrangement suffers from very high hysteresis caused by drag forces on the sealing faces and the butterfly edges.

FIGS. 4 and 5 illustrate a sealing arrangement in accordance with the invention; gas flow is in the direction indicated by arrow F.

The butterfly spindle 14a is plain but for a flat or groove 27 whose purpose will be explained below.

The housing 11a has two radially outward steps in the spindle bore which define annular spaces 24 and 25 as illustrated. The outer and larger space 25 houses an annular seal of graphite or like material which is a light interference fit on the spindle 14a but has radial clearance from the housing 11a. The seal 26 is retained by a cover plate 23a attached to the housing 11a by set screws, as illustrated, or any other suitable means.

Whilst the clearances in FIGS. 4 and 5 are somewhat exaggerated for the purpose of explanation, it should be clear that the seal 26 can slide along the spindle 14a and imposes no significant axial load thereon.

The inner annular space 24 communicates with the downstream side of the butterfly by virtue of a flat or groove 27 such that when the butterfly is closed, pressure in the inner space 24 is vented to the downstream side.

FIG. 4 illustrates the butterfly 15 in the open condition, exhaust gas passing freely through the obturator. Gas pressure upstream and downstream of the butterfly is negligible and thus the load on the spindle is also negligible. As illustrated, the radial spindle clearance 28 is the same both on upstream and downstream sides.

FIG. 5 illustrates the butterfly 15 in the closed condition having been turned through 90° by the lever 17. Other lever angles are possible depending on the type of butterfly used. In use, exhaust gas pressure builds upon the upstream side and pushes the spindle in the direction of gas flow, thus increasing the spindle clearance 28 on the upstream side and reducing the clearance on the downstream side to zero.

Gas pressure builds up in the inner annular space 24 and urges the seal 26 against the inner surface 29 of the cover plate 23a to provide a gas seal. The seal 26 slides along the spindle to the sealing position. The flat or groove 27 ensures that pressure in the inner space 24 is vented to exhaust. (FIG. 6 illustrates a groove 27a at approximately 45° to the plane of the butterfly).

The arrangement of the floating annular seal 26 ensures that gas sealing is not impaired by the inevitable movement of the butterfly spindle 14a in the downstream direction, and the consequent large clearance on the high pressure side.

FIG. 5 also illustrates alternative vent passageways for the inner space 24, such as a cast passage 27b or drilled hole 27c. Where the vent is on the spindle (flat 27 or groove 27a) it is situated off the line of pressure to ensure maximum transverse spindle load is applied to full supporting area. Similarly the passage 27b and hole 27c may be arranged to enter the annular space 24 other than as the centreline of the housing 11a.

In use, a vent having an effective passageway of 3.2 mm diameter will facilitate sealing of a 22 mm diameter spindle with a diametral clearance of 0,35 mm at back pressure of 4 bar (60 p.s.i). The vent size is chosen to ensure sufficient pressure build-up in the inner space 24 to flip the seal 26 against the cover plate 23a, but not so much pressure build-up that the axial load is excessive and would result in an unacceptable degree of wear. A similar vent is provided for the opposite spindle journal (not illustrated) to avoid a build-up of pressure exerting an axial load on the spindle with potential fouling of the butterfly 15 with the wall of the housing 11a; such fouling would result in increased wear and, more importantly, unacceptable hysteresis.

A seal 26 of graphite is preferred since it has excellent resistance in degradation at high temperatures whilst being self-lubricating and unaffected by corrosive exhaust gases and moisture. Other materials having similar properties would also be acceptable.

The fit of the butterfly 15 in the housing 11a is determined by the need to avoid frictional contact with the inner wall of the housing whilst ensuring the necessary axial movement of the spindle 14a as the seal 26 moves to seal against the cover plate 23a. In practice the normal clearance between the seal 26 and coverplate 23a can be very small so that axial movement of the seal on the spindle is minimal.

The use of gas pressure to urge the seal against the cover plate is preferred, although it is possible to use a resilient member, such as a coil 30 spring to urge the seal 26 against a sealing face of the annular spaces 24,25. In this case the annular space need not have the double diameter illustrated in FIGS. 4 and 5. The use of resilient means to load the seal constantly against a sealing surface may result in the seal wearing more rapidly than the gas activated seal described with reference to FIGS. 4–6.

The seal provides a substantially friction free gas seal which is especially useful in conjunction with a reactive exhaust brake.

We claim:

1. An exhaust gas obturator comprising a tubular housing, a spindle crossing said housing and journalled on a wall thereof, and a butterfly valve attached to said spindle and arcuately movable with the spindle to open and close the obturator, the wall of the housing defining a chamber through which said spindle passes, the chamber defining an annular space around said spindle, said chamber having a sealing face substantially perpendicular to the axis of said spindle, said chamber having a gas vent passage connected to a downstream side of said butterfly valve so that exhaust gas pressure in said chamber from an upstream side is vented to said downstream side to alleviate leakage to the exterior of said housing due to any clearance between said spindle and said housing, and said spindle having an annular sealing ring slidable thereon and movable into sealing engagement with said sealing face under the action of the exhaust gas pressure from said upstream side for maintaining an effective seal therebetween and for sealing off the chamber from the exterior of the housing.

2. An obturator according to claim 1 further including resilient means for biasing said sealing ring against said sealing face.

3. An obturator according to claim 2 wherein said resilient means comprises a coil spring coiled about said spindle.

4. An obturator according to claim 1 wherein said sealing face is an inwardly facing side of said chamber.

5. An obturator according to claim 1 wherein said chamber comprises a fluid pressure chamber having a fluid connection to the upstream side of said butterfly valve so that said exhaust pressure pushes said sealing ring against said sealing face.

6. An obturator according to claim 5 wherein the upstream connection comprises a clearance between the butterfly valve spindle and said housing.

7. An obturator according to claim 5 wherein said chamber is cylindrical and has end faces substantially perpendicular to the axis of said butterfly valve spindle, the chamber having an outer first diameter portion and an inner second diameter portion, said sealing ring being located within said first diameter portion (25) and having an outer diameter less than that of said first diameter portion and greater than that of said second diameter portion.

8. An obturator according to claim 11 wherein said sealing ring is principally of graphite.

9. An obturator according to claim 1 wherein the downstream connection comprises a groove of the butterfly valve spindle.

10. An obturator according to claim 9 wherein said downstream connection is parallel to the longitudinal axis of said butterfly valve spindle and at approximately 45° to the plane of said butterfly valve.

11. An obturator according to claim 1 wherein the downstream connection comprises a flat of the butterfly valve spindle.

12. An obturator according to claim 1 wherein the downstream connection comprises a passage in the wall of said housing.

13. An obturator according to claim 1 wherein said sealing ring is of a carbon based material.

* * * * *